United States Patent [19]

Tai

[11] 4,391,932

[45] Jul. 5, 1983

[54] POLYCATIONIC LATICES OF DIMETHYLAMINOPROPYL-ACRYLAMIDE, AND THEIR USE OF AS SLUDGE DEWATERING AGENTS AND/OR PAPER RETENTION AIDS

[75] Inventor: Wun T. Tai, Palos Hills, Ill.

[73] Assignee: Nalco Chemical Company, Oak Brook, Ill.

[21] Appl. No.: 341,971

[22] Filed: Jan. 22, 1982

[51] Int. Cl.$^3$ ............................................. C08J 3/02
[52] U.S. Cl. ................................... 523/337; 524/475; 524/801
[58] Field of Search ................. 523/337; 524/475, 801

[56] References Cited

U.S. PATENT DOCUMENTS 3,624,019 11/1971 Anderson et al. ............. 260/29.6 H
3,647,769 3/1972 Bofton et al. ...................... 260/85.5
4,073,763 2/1978 Tai ............................... 260/29.4 UA

*Primary Examiner*—Joseph L. Schofer
*Assistant Examiner*—Bernard Lipman
*Attorney, Agent, or Firm*—John G. Premo; Robert A. Miller

[57] ABSTRACT

Water-in-oil emulsions of copolymers of acrylamide and dimethylaminopropylacrylamide are disclosed. These polymers find use as retention aids in the manufacture of paper and as dewatering agents for municipal and industrial aqueous waste materials. Methods of preparing these polymers are disclosed.

7 Claims, No Drawings

POLYCATIONIC LATICES OF DIMETHYLAMINOPROPYL-ACRYLAMIDE, AND THEIR USE OF AS SLUDGE DEWATERING AGENTS AND/OR PAPER RETENTION AIDS

This invention relates to water-in-oil emulsions of a copolymer of acrylamide and dimethylaminopropyl acrylamide. The water-in-oil emulsions which are formed can be readily inverted to cause the rapid solubilization of the polymer contained therein. The emulsions are formed by first forming a copolymer of acrylonitrile and acrylamide in water-in-oil emulsion form and then reacting the material, in emulsion form, with dimethylaminopropylamine. The resultant products are useful as retention aids in the production of paper and as useful coagulants in the mining, waste treatment and paper industries.

PRIOR ART

Water-soluble copolymers of acrylamide and dimethylaminopropylacrylamide are known. U.S. Pat. No. 3,647,769, which is hereinafter incorporated by reference, teaches the formation of a copolymer of acrylonitrile and acrylamide followed by reaction of this copolymer with a primary or secondary amine. Examples are given in this reference in a reaction of polyacrylonitrile with N,N-dimethyl 1,-propanediamine.

While polymers of this type are useful in many commercial applications, preparation methods such as those described in U.S. Pat. No. 3,647,769, have several drawbacks. In the first place, one must limit either concentration and/or molecular weight due to the viscosity of the resultant water-soluble polymer. It is well-known in the art that, generally, as molecular weight increases for water-soluble polymers, viscosity also increases. This is also true for concentration of the polymer in aqueous solution. The shipment of dilute materials, i.e., concentrations lower than 10% by weight polymer, is impractical due to transportation costs incurred for essentially shipping water. It is also known in the art that for many application molecular weight is very critical, with higher molecular weights often being preferred over low molecular weight material. By the practice of U.S. Pat. No. 3,647,769 aqueous solutions of the polymer are produced. These solutions must either have a low molecular weight, or must be shipped as very dilute solutions. It would, therefore, be an advance to the art if materials of this type could be prepared which were of high molecular weight, and could be shipped in high concentration. Additionally, since materials of this type are used in aqueous environments, they must be soluble in water.

I have discovered that copolymers of acrylamide and dimethylaminopropylacrylamide can be prepared in water-in-oil emulsion form by first preparing acrylamide:acrylonitrile copolymers and then reacting this copolymer in water-in-oil emulsion form to produce a final copolymer of acrylamide:dimethylaminopropylacrylamide.

THE INVENTION

The water-in-oil emulsion polymers of acrylamide:acrylonitrile, which are used in this invention, can be prepared according to the teachings of U.S. Pat. No. 3,284,393 to Vanderhoff. It is known that water-in-oil emulsion of this type can be "inverted" when they are added to water, so as to cause rapid solubilization of the polymer contained therein as evidenced by Anderson, et al, U.S. Pat. No. 3,624,019.

THE WATER-IN-OIL EMULSIONS OF WATER SOLUBLE VINYL ADDITION POLYMERS

The water-in-oil emulsions of water soluble vinyl addition polymers useful in this invention contain four basic components. These components and their weight percentages in the emulsions are listed below:

A. Water soluble vinyl addition polymer:
  1. Generally from 5–60%;
  2. Preferably from 20–40%; and
  3. Most preferably from 25–35%;
B. Water:
  1. Generally from 20–90%;
  2. Preferably from 20–70%; and
  3. Most preferably from 30–55%;
C. Hydrophobic liquid:
  1. Generally from 5–75%;
  2. Preferably from 5–40%; and
  3. Most preferably from 20–30%; and
D. Water-in-oil emulsifying agent:
  1. Generally from 0.1–21%;
  2. Preferably from 1–15%; and
  3. Most preferably from 1.2–10%.

It is also possible to further characterize the water-in-oil emulsions of water soluble vinyl addition polymers with respect to the aqueous phase of the emulsions. This aqueous phase is generally defined as the sum of the polymer or copolymer present in the emulsion plus the amount of water present in the emulsion. This terminology may also be utilized in describing the water-in-oil emulsions which are useful in this invention. Utilizing this terminology, the aqueous phase of the water-in-oil emulsions of this invention generally consists of 25–95% by weight of the emulsion. Preferably, the aqueous phase is between 60–90% and most preferably from 65–85% by weight of the emulsion.

The emulsions also may be characterized in relation to the water/oil ratios. This figure is simply a ratio of the amount of water present in the emulsion divided by the amount of hydrophobic liquid present in the emulsion. Generally, the water-in-oil emulsions of this invention will have a water/oil ratio of from 0.25 to 18. Preferably, the water-in-oil ratio will range from 0.5–14, and most preferably from 1.0–2.75.

THE WATER SOLUBLE VINYL ADDITION POLYMERS

The water-soluble vinyl addition polymers useful in this invention are copolymers of acrylamide and acrylonitrile. Due to the fact that the polymerization step is carried out in water-in-oil emulsion form and the further fact that while acrylamide is water-soluble, acrylonitrile tends to be soluble in the hydrophobic liquid present in the emulsion, copolymers employed in this invention generally contain between 1–50% by weight of acrylonitrile and preferably from 10–40% by weight of acrylonitrile. Polymers prepared according to this invention generally have molecular weights higher than 100,000, and most preferably above several million. A preferred copolymer has a molecular weight of approximately 5,000,000. A particularly preferred copolymer has an intrinsic viscosity of approximately 8.0.

THE HYDROPHOBIC LIQUIDS

The hydrophobic liquids or oils used in preparing these emulsions may be selected from a large group of organic liquids which include liquid hydrocarbons and substituted liquid hydrocarbons.

A preferred group of organic liquids that can be utilized in the practice of this invention are paraffinic hydrocarbon oils. Examples of these types of materials include a branch-chain isoparaffinic solvent sold by Humble Oil and Refinery Company under the tradename "Isopar M" described in U.S. Pat. No. 3,624,019 and a paraffinic solvent sold by the Exxon Company, U.S.A. called "Low Odor Paraffinic Solvent." Typical specifications of this material are set forth below in Table I.

TABLE I

| Specific Gravity 60°/60° F. | 0.780–0.806 |
| --- | --- |
| Color, Saybolt | +30 min. |
| Appearance, visual | Bright and Clear |
| Aniline Point, °F., ASTM D-611 | 160 min. |
| Distillation, °F., ASTM D-86 | |
| IBP | 365 min. |
| FBP | 505 max. |
| Flash Point, °F., TCC | 140 min. |
| Sulfur, ppm, Microcoulometer | 15 max. |

While paraffinic oils are the preferred materials for use in preparing the water-in-oil emulsions of this invention, other organic liquids can be utilized. Thus, mineral oils, kerosenes, naphthas, and in certain instances petroleum may be used. While useful in this invention, solvents such as benezene, xylene, toluene, and other water immiscible hydrocarbons having low flash points or toxic properties are generally avoided due to problems associated with their handling.

THE WATER-IN-OIL EMULSIFYING AGENTS

Any conventional water-in-oil emulsifying agent can be used such as sorbitan monostearate, sorbitan monooleate, and the so-called low HLB materials which are all documented in the literature and are summarized in the Atlas HLB Surfactants Selector. Although the mentioned emulsifiers are used in producing good water-in-oil emulsions, other surfactants may be used as long as they are capable of producing these emulsions. It is also contemplated, however, that other water-in-oil emulsifying agents can be utilized.

U.S. Pat. No. 3,997,492 shows the use of emulsifiers generally having higher HLB values to produce stable emulsions similar in character to those discussed above. With the use of the equations present in this reference, which is hereinafter incorporated by reference, emulsifiers having HLB values between 4–9 can be utilized in the practice of this invention.

In addition to the reference described above, U.S. Pat. No. 4,024,097 discloses particular emulsifying agents for the water-in-oil emulsions, which are the subject of this invention. These emulsions are generally prepared according to this reference utilizing a water-in-oil emulsifying agent comprising a partially esterified lower N,N-dialkanol substituted fatty amide. Additionally, other surfactants may be combined to produce emulsions having small particle sizes and excellent storage stability.

THE PREPARATION OF THE WATER-IN-OIL EMULSIONS OF WATER SOLUBLE VINYL ADDITION POLYMERS

The general method for the preparation of emulsions of the type described above is contained in Vanderhoff, U.S. Pat. No. 3,284,393, which is hereinafter incorporated by reference. A typical procedure for preparing water-in-oil emulsions of this type includes preparing an aqueous solution of a water soluble vinyl addition monomer and adding this solution to one of the hydrocarbon oils described above. With the addition of a suitable water-in-oil emulsifying agent and under agitation, the emulsion is then subjected to free radical polymerization conditions and a water-in-oil emulsion of the water soluble vinyl addition polymer is obtained. It should be pointed out that the ingredients are chosen based upon the weight percentages given above and their compatability with each other. As to choice of free radical catalyst, these materials may be either oil or water soluble and may be from the group consisting of organic peroxides, Vazo-type materials, redox-type initiator systems, etc. Additionally, ultraviolet light, microwaves, etc. will also cause the polymerization of water-in-oil emulsions of this type.

In the manufacture of emulsions of this type, which are further detailed in U.S. Pat. No. 3,624,019, U.S. Pat. No. Re. 28,474, U.S. Pat. No. 3,734,873, U.S. Pat. No. Re. 28,576, U.S. Pat. No. 3,826,771, all of which are hereinafter incorporated by reference, the use of air may be employed to control polymerization. This technique is described in U.S. Pat. No. 3,767,629, which is also hereinafter incorporated by reference.

In addition to the above references, U.S. Pat. No. 3,996,180 describes the preparation of water-in-oil emulsions of the types utilized in this invention by first forming an emulsion containing small particle size droplets between the oil, water, monomer and water-in-oil emulsifying agent utilizing a high shear mixing technique followed by subjecting this emulsion to free radical polymerization conditions. Also of interest is U.S. Pat. No. 4,024,097 which describes water-in-oil emulsions such as those described above utilizing particular surfactant systems for the water-in-oil emulsifying agent, allowing for the preparation of latexes having small polymer particle sizes and improved storage stability.

Another reference, U.S. Pat. No. 3,915,920, discloses stabilizing water-in-oil emulsions of the type above described utilizing various oil-soluble polymers such as polyisobutylene. Employment of techniques of this type provides for superior stabilized emulsions.

Of still further interest in U.S. Pat. No. 3,997,492 which describes the formation of water-in-oil emulsions of the type above described utilizing emulsifiers having HLB values of between 4–9.

PHYSICAL PROPERTIES OF THE WATER-IN-OIL EMULSIONS

The water-in-oil emulsions of the finely divided water-soluble polymers useful in this invention contain relatively large amounts of polymer. The polymers dispersed in the emulsion are quite stable when the particle size of the polymer is from the range of 0.1 microns up to about 5 microns. The preferred particle size is generally within the range of 0.2 microns to about 3 microns. A most preferred particle size is generally within the range of 0.2 to 2.0 microns.

The emulsions prepared having the above composition generally have a viscosity in the range of from 500 to 1000 cps. It will be seen, however, that the viscosity of these emulsions can be affected greatly by increasing or decreasing the polymer content, oil content, or water content, as well as the choice of a suitable water-in-oil emulsifier.

Another factor attributing to the viscosity of these types of emulsions is the particle size of the polymer which is dispersed in the discontinuous aqueous phase. Generally, the smaller the particle obtained the less viscous the emulsion. At any rate, it will be readily apparent to those skilled in the art as to how the viscosity of these types of materials can be altered. It will be seen that all that is important in this invention is the fact that the emulsion be somewhat fluid, i.e., pumpable.

THE PREPARATION OF ACRYLAMIDE:DIMETHYLAMINOPROPYL ACRYLAMIDE COPOLYMERS

Once the water-in-oil emulsion of the acrylamide:acrylonitrile copolymer is formed, it is then reacted with cimethylaminopropylamine. This reaction is accomplished by simply adding to the water-in-oil emulsion of the acrylamide:acrylonitrile copolymer near or as an aqueous solution dimethylaminopropylamine. While dimethylaminopropylamine reacts on a 1:1 molar basis with the acrylonitrile present in the copolymer, I prefer to use an excess of dimethylaminopropylamine to facilitate the conversion of acrylonitrile unit to dimethylaminopropylacrylamide. The reaction of the dimethylaminopropylamine with the acrylamide:acrylonitrile copolymer of this invention is generally run at temperatures ranging from about 20° C. to 80° C. Generally, I prefer to run reactions of this type at temperatures of 30°–50° C.

Due to the fact that additional material, often including water, is being added to the water-in-oil emulsion, and the fact that by virtue of the reaction of the dimethylaminopropyl acrylamide with the acrylonitrile unit of the polymer, the solids content of the water-in-oil emulsion increases, it is often-times necessary to add additional water-in-oil emulsifiers to the mixture, as well as hydrophobic liquid to maintain emulsion stability. Additional water to be added is generally mixed with the dimethylaminopropylamine prior to addition. Generally, from 25–150% by weight water is added based upon the weight of the dimethylaminopropylamine added. Generally, equal weights of dimethylaminopropylamine and water are added.

Additional water-in-oil surfactant which is to be added generally encompasses from 1–10% and preferably 1–5% by weight of the starting acrylamide:acrylonitrile copolymer. Due to the fact that the resultant copolymer contains a cationic charge, an emulsifier should be selected which is compatible with this type of material. Selection of surfactants for this purpose must, however, unfortunately be made on a trial and error method. However, I have found that surfactants useful include sorbitan monosterate and Alkaterge "T," a modified oxazoline.

The reaction time employed to react the water-in-oil emulsion of the acrylamide:acrylonitrile copolymer with the dimethylaminopropylamine ranges from as little as 15 minutes to as long as 8 hours. Generally, if the reaction is conducted at approximately 45° C., the reaction is generally complete in from two to four hours.

At the end of the reaction, a water-soluble surfactant may optionally be added to the water-in-oil emulsion of the acrylamide:dimethylaminopropylacrylamide copolymer. This water-soluble surfactant is used to invert the water-in-oil emulsion when it is added to water and thus cause the rapid solubilization of the polymer contained therein for its ultimate use in the application chosen.

THE INVERSION OF THE WATER-IN-OIL EMULSIONS OF THE WATER SOLUBLE VINYL ADDITION POLYMERS

The water-in-oil emulsions of the water-soluble polymers discussed above have unique ability to rapidly invert when added to aqueous solution in the presence of an inverting agent or physical stress. Upon inversion, the emulsion releases the polymer into water in a very short period of time when compared to the length of time required to dissolve a solid form of the polymer. This inversion technique is described in U.S. Pat. No. 3,624,019, hereinafter incorporated by reference. As stated in the Anderson reference, the polymer-containing emulsions may be inverted by any number of means. The most convenient means resides in the use of a surfactant added to either the polymer-containing emulsion or the water into which it is to be placed. The placement of a surfactant into the water causes the emulsion to rapidly invert and release the polymer in the form of an aqueous solution. When this technique is used to invert the polymer-containing emulsion, the amount of surfactant present in the water may vary over a range of 0.01 to 50% based on the polymer. Good inversion often occurs within the range of 1.0–10% based on polymer.

The preferred surfactants utilized to cause the inversion of the water-in-oil emulsion of this invention when the emulsion is added to water are hydrophillic and are further characterized as being water soluble. Any hydrophillic-type surfactant, such as ethoxylated nonyl phenols, ethoxylated nonyl phenol formaldehyde resins, dioctyl esters of sodium succinate and octyl phenol polyethoxy ethanols, etc. can be used. Preferred surfactants are generally nonyl phenols which have been ethoxylated with between 8–15 moles of ethylene oxide. A more complete list of surfactants used to invert the emulsion are found in Anderson, U.S. Pat. No. 3,624,019, at columns 4 and 5.

Accordingly, this invention is directed to the preparation of an acrylamide-dimethylaminopropyl acrylamide copolymer in water-in-oil emulsion form. In summary, this material is prepared by the following steps:

A. forming a water-in-oil emulsion of an acrylamide-acrylonitrile copolymer, said water-in-oil emulsion containing:
  a. 5–60% by weight acrylamide-acrylonitrile copolymer,
  b. 20–90% water,
  c. 5–75% of hydrophobic organic liquid,
  d. 0.1–21% water-in-oil emulsifying agent;

B. reacting said water-in-oil emulsion of the acrylamide-acrylonitrile copolymer with dimethylaminopropylamine in a molar ratio of dimethylaminopropylamine to acrylonitrile of from 1:1 to 0.1:1;

C. recovering a readily invertible water-in-oil emulsion of an acrylamide-dimethylaminopropyl acrylamide copolymer.

The copolymer of acrylamide and acrylonitrile that are employed in this invention will generally contain a ratio of acrylamide to acrylonitrile of from 95:5 to 50:50. Preferably acrylamide-acrylonitrile copolymers used will contain a weight ratio of from 80:20 to 60:40.

When reacting these copolymers with dimethylaminopropylamine, preferably from 40–100% dimethylaminopropylamine is used on a molar basis to the acrylonitrile present.

In order to more fully illustrate this invention, the following examples are presented:

EXAMPLE 1

This example illustrates the formation of a 20:80 by weight acrylonitrile:acrylamide copolymer water-in-oil emulsion.

To a reactor equipped with stirrer, nitrogen sparge, tube, condenser, and additional funnel, was added 689.05 parts of LPOS, 17.5 parts of Alkaterge "T", a substituted oxazoline, and 17.5 parts of Span 80, a sorbitan monostearate. This mixture was then stirred, and an aqueous phase consisting of 511.5 parts of acrylamide, 1,121 parts of water and a minor amount of boric anhydride was then added to form a water-in-oil emulsion. To the resultant water-in-oil emulsion were added 128 parts of acrylonitrile followed by 0.95 parts of Azo 52, a free radical catalyst dissolved in 3.0 parts of dimethyl formamide. The mixture was then stirred vigorously for ten minutes and stirring terminated.

The reactor was pressurized with nitrogen, stirred for three minutes and nitrogen was then discharged. This procedure was repeated three times to purge oxygen in the system for polymerization.

After purging, the emulsion was heated to 45° C. An exotherm developed. The reactor was held at a temperature of 47°±2° C. by alternative heating and cooling. After the reactor had been maintained at a temperature of 47° for five hours, the temperature was raised to 60° C. and held at that temperature for an additional one hour and 18 minutes after which time the reaction was terminated and the material collected.

The resultant water-in-oil emulsion of the acrylonitrile acrylamide copolymer contained 27.7% solids, had an intrinsic viscosity of 5.67. The latex contained 3.7% residual acrylamide. This material is labeled Example 1.

EXAMPLE 2

A water-oil emulsion of a 10:90 by weight acrylonitrile:acrylamide copolymer was formed. The procedure used is similar to that of Example 1. Ingredients used and their weight percentages are listed below:
  acrylamide—20.92%
  water—43.39%
  acrylonitrile—2.32%
  Isopar M—32.15%
  Span 80—1.16%
  Azo 52—0.05%

Following the procedure of Example 1 and maintaining the exotherm part of the reaction at 45° plus or minus 1° C., a material was obtained containing 23.24% polymer and having an intrinsic viscosity of 8.89. There was 2.9% residual acrylamide which remained unreacted.

EXAMPLE 3

The procedure of Example 2 was followed in the preparation of an acrylonitrile:acrylamide 10:90 by weight copolymer. The ingredients and their percentages are listed below:
  acrylamide—20.92%
  water—48.97%
  acrylonitrile—2.32%
  Versene (2% by weight)—0.23%
  Isopar M—26.34%
  Span 80—1.16%
  Azo 52—0.05%

A water-in-oil emulsion of the 10:90 acrylontrile:acrylamide copolymer was obtained. The material contained 23.24% polymer, had an intrinsic viscosity of 11.5, and contained 0.7% residual acrylamide. This material was labeled Example 3.

EXAMPLE 4

A 30:70 by weight acrylonitrile:acrylamide copolymer in water-in-oil emulsion form was made. The procedure essentially followed that of Example 1. Ingredients and their weight percentages are listed below:
  acrylamide—14.0%
  water—52.22%
  acrylonitrile—6.0%
  Versene (2% by weight)—0.23%
  Isopar M—26.34%
  Span 80—1.16%
  Azo 52—0.05%

Temperatures employed were similar to that of Example 3. A water-in-oil emulsion of the acrylonitrile-acrylamide copolymer was obtained. The polymer had an intrinsic viscosity of 5.25 and the water-in-oil emulsion contained 21.1% solids.

EXAMPLE 5

This example shows the formation of a 40:60 by weight acrylonitrile:acrylamide copolymer in water-in-oil emulsion form. The procedure followed is similar to that of Example 1. Ingredients and their percent by weight are listed below:

| | |
|---|---|
| acrylamide | 11.3% |
| water | 52.54% |
| acrylonitrile | 7.54% |
| Versene (2% by weight) | .18% |
| concentrated sulfuric acid to pH 3.0 | |
| Isopar M | 27.2% |
| Azo 52 | .04% |
| Span 80 | 1.2% |

The resultant water-in-oil emulsion of the acrylonitrile:acrylamide copolymer contained 20% solids.

EXAMPLE 6

Formation of acrylonitrile:acrylamide copolymer 20:80 by weight. Procedure of Example 1 was followed. Ingredients and their weight percentages are listed below:
  acrylamide—20.46%
  water—44.84%
  boric anhydride—0.23%
  Versene (2% by weight)—0.23%
  LOPS—27.56%
  Alkaterge T—0.7%
  Span 80—0.7%
  acrylonitrile—5.12%
  Azo 52—0.038%
  dimethyl formamide—0.12%

The resultant water-in-oil emulsion had an intrinsic viscosity of 5.67 and contained 27.2% solids.

EXAMPLE 7

This example shows the preparation of a 40:60 by weight acrylonitrile:acrylamide copolymer in water-in-oil emulsion form. The procedure followed is essentially similar to that in Example 1. Ingredients and their weight percentages are listed below:
- acrylamide—11.29%
- water—55.89%
- Versene (2% by weight)—0.18%
- acrylonitrile—7.54%
- sulfuric acid—0.01%
- LOPS—23.8%
- Span 80—1.2%
- Azo 52—0.04%
- Vazo ® 64 (A trademark of E. I. DuPont de Nemours)—0.01%
- dimethyl formamide—0.04%

The resultant water-in-oil emulsion contained 24.8% solids and had a viscosity of 500 cps. The emulsion contained 7.3% residual acrylamide, and 2.1% residual acrylonitrile.

EXAMPLE 8

An acrylonitrile:acrylamide 20:80 by weight latex was formed. Using the same procedure, identical runs were made; one at pH 3.0, and one at pH 7.0. Ingredients used for both runs are listed as follows:
- acrylamide—18.6%
- water—48.69%
- Versene (2%)—0.23%
- boric anhydride—0.23%
- acrylonitrile—4.69%
- sulfuric acid—0.01% (0.002% on run at pH 7.0)
- LOPS—26.34%
- Alkaterge T—0.6%
- Span 80—0.6%
- Azo 52—0.05%

The procedure of Example 1 was followed for both runs.

The water-in-oil emulsion at pH 3.0 had an intrinsic viscosity of 5.69 and contained 5.1% residual acrylamide. The water-in-oil emulsion at pH 7.0 had an intrinsic viscosity of 5.58 and had 6.2% residual acrylamide. These materials were labeled Examples 8 a. and 8 b., respectively.

EXAMPLE 9

Acrylonitrile-acrylamide water-in-oil emulsion 40:60% by weight. The procedure of Example 1 was followed, and their weight percent ingredients are listed below:
- acrylamide—11.3%
- water—52.54%
- acrylonitrile—7.54%
- Versene (2%)—0.18%
- Isopar M—27.2%
- Span 80—1.20%
- Azo 52—0.04%

The resultant water-in-oil emulsion of the 40:60 acrylonitrile-acrylamide copolymer had an intrinsic viscosity of 2.77 and contained 17.75% solids.

EXAMPLE 10

A water-in-oil emulsion was made similar to Example 8 b (226b) with the exception that more nitrogen was used. The resultant water-in-oil emulsion of the acrylonitrile-acrylamide 20:80 copolymer had an intrinsic viscosity of 6.29 and contained 6.3% residual acrylamide.

EXAMPLE 11

A 20:80 percent by weight acrylonitrile-acrylamide copolymer latex was formed. The procedure used was similar to that of Example 8 b. Ingredients and their weight percent are listed below:
- acrylamide—18.6%
- water—48.97%
- acrylonitrile—4.65%
- Versene (2.0%)—0.23%
- Isopar M—26.34%
- Span 80—1.16%
- Azo 52—0.05%

The resulting water-in-oil emulsion had an intrinsic viscosity of 8.7 and contained 1.8% residual acrylamide. This material was labeled Example 11.

EXAMPLE 12

A 30:70 weight percent acrylonitrile-acrylamide latex was formed. The procedure followed was similar to Example 1. Ingredients and their weight percents are listed below:
- acrylamide—14.0%
- water—52.21%
- acrylonitrile—6.0%
- Versene (2%)—0.23%
- Isopar M—26.34%
- Span 80—1.16%
- Azo 52—0.05%

The resultant water-in-oil emulsion of the 30:70 acrylonitrile-acrylamide latex had an intrinsic viscosity of 5.94 and contained 5.1 residual acrylamide. This material was labeled Example 12.

EXAMPLE 13

In order to form the compositions of this invention, the water-in-oil emulsions of the acrylonitrile-acrylamide copolymer exemplified in Examples 1–12 must be reacted with dimethylaminopropylamine. Examples 13–39 found in Table II show the reaction of this material with the indicated starting latex material. Reactions were carried out by using the starting latex indicated, adding additional water-in-oil emulsifiers to the latex (each indicated), adding the dimethylaminopropylamine either neat or as a 50% aqueous solution to the resulting latex solid and then heating for the time period indicated.

TABLE II

| Example | 13 | 14 | 15 | 16 | 17 | 18 | 19 | 20 | 21 | 22 | 23 | 24 | 25 |
|---|---|---|---|---|---|---|---|---|---|---|---|---|---|
| Starting Example | 1 | 1 | 1 | 1 | 1 | 3 | 4 | 5 | 6 | 7 | 7 | 7 | 7 |
| Pts. Latex | 100.0 | 200.0 | 100.0 | 150.0 | 150.0 | 100.0 | 309.2 | 100.0 | 400.0 | 100.0 | 100.0 | 100.0 | 100.0 |
| H$_2$O | 6.87 | 13.75 | 5.91 | 5.91 | 14.77 | — | 28.57 | — | 25.57 | 5.65 | 2.9 | 8.71 | 8.71 |
| Span 80 | .05 | 1.0 | .43 | .65 | .75 | — | 3.0 | — | — | — | — | — | — |
| Alk. "T" | .05 | 1.0 | .43 | .65 | .75 | — | 3.0 | .8 | 1.9 | .5 | .25 | .75 | .75 |
| Brij 92 | — | — | — | — | — | .8 | — | .8 | 1.9 | .5 | .25 | .75 | .75 |
| DMAP Amine | 6.875 | 13.75 | 5.91 | 5.91 | 14.77 | 4.46 | 28.57 | 14.5 | 27.57 | 5.65 | 2.9 | 8.71 | 8.71 |
| Tween 61 | — | — | — | — | — | .8 | — | — | — | — | — | — | — |
| Isopar M | — | — | — | — | — | 3.0 | — | 3.0 | — | — | — | — | — |

TABLE II-continued

| | | | | | | | | | | | | | |
|---|---|---|---|---|---|---|---|---|---|---|---|---|---|
| LOPS | — | — | — | — | — | — | 30.0 | — | — | — | — | 3.0 | 3.0 |
| Moles DMAPA/ | | | | | | | | | | | | | |
| ACY | .80 | .80 | .60 | .40 | 1.0 | 1.0 | .8 | 1.0 | .8 | .4 | .2 | .6 | .6 |
| T °C. | 60° | 70° | 70° | 70° | 70° | 80° | 80° | 80° | 80° | 80° | 80° | 80° | 80° |
| Time (hrs.) | 2.0 | 2.5 | 1.75 | 4.2 | 2.16 | 1.66 | 1.83 | 1.1 | 2.36 | 1.5 | 1.5 | 1.0 | 2.0 |
| Intrinsic | | | | | | | | | | | | | |
| Viscosity | 7.14 | 6.7 | 5.19 | 6.18 | — | 6.0 | — | 5.25 | 4.16 | 3.7 | — | — | — |
| % Cationic | | | | | | | | | | | | | |
| Charge | 12.5 | 10.1 | 11.5 | 9.0 | 16.7 | — | 21 | 27.7 | 20.6 | 24.0 | 10.6 | 29.3 | 25.3 |
| Example | 26 | 27 | 28 | 29 | 30 | 31 | 32 | 33 | 34 | 35 | 36 | 37 | 38 | 39 |
| Starting | | | | | | | | | | | | | | |
| Example | 7 | 7 | 8B | 8B | 8B | 8B | 8B | 8B | 8B | 8B | 9 | 10 | 11 | 12 |
| Pts. Latex | 100.0 | 100.0 | 250.0 | 250.0 | 250.0 | 250.0 | 250.0 | 250.0 | 250.0 | 250.0 | 100.0 | 250.0 | 100.0 | 100.0 |
| H$_2$O | 11.6 | 11.6 | 17.87 | 17.87 | 17.87 | 17.87 | 17.87 | 17.87 | 17.87 | 17.87 | 11.6 | 17.87 | — | 11.5 |
| Span 80 | — | — | — | — | — | — | — | — | — | — | — | — | 1.6 | — |
| Alk. "T" | 1.0 | 1.0 | 1.6 | 1.6 | 1.6 | 1.6 | 1.6 | 1.6 | 1.6 | 1.6 | 1.0 | 1.6 | .8 | .8 |
| Brij 92 | 1.6 | 1.6 | 1.6 | 1.6 | 1.6 | 1.0 | — | .8 | .8 | | | | | |
| DMAP Amine | 11.6 | 11.6 | 17.87 | 17.87 | 17.87 | 17.87 | 17.87 | 17.87 | 17.87 | 17.87 | 11.6 | 17.87 | 8.95 | 11.55 |
| Tween 61 | — | — | — | — | — | — | — | — | — | — | — | — | — | — |
| Isopar M | — | — | — | — | — | — | — | — | — | — | — | — | 3.0 | 3.0 |
| LOPS | 5.0 | — | — | — | — | — | — | — | — | — | — | — | — | — |
| Moles DMAPA/ | | | | | | | | | | | | | | |
| ACY | .8 | .8 | .8 | .8 | .8 | .8 | .8 | .8 | .8 | — | .8 | .8 | — | — |
| T °C. | 80° | 80° | 80° | 80° | 80° | 80° | 45° | 45° | 45° | 45° | 80° | 45° | 80° | 80° |
| Time (hrs.) | 1.0 | 2.0 | .3 | .5 | .83 | 1.16 | 1.0 | 2.0 | 3.0 | 4.0 | 5.0 | 2.0 | .25 | .25 |
| Intrinsic | | | | | | | | | | | | | | |
| Viscosity | — | — | 6.1 | 5.8 | 5.5 | 6.7 | 6.3 | — | 6.3 | — | 4.10 | 5.9 | — | — |
| % Cationic | | | | | | | | | | | | | | |
| Charge | 43.5 | 40.0 | 14.2 | 14.9 | 16.8 | 18.1 | 4.4 | 7.8 | 9.7 | 10.3 | 35.0 | 6.2 | — | — |

The cationically charged water-in-oil emulsion of the dimethylaminopropylamine acrylamide copolymer is then obtained.

As seen from the subject examples, a unique and novel water-soluble polymeric material can be prepared from relatively inexpensive starting materials. The polymers are generally quite stable when the pH of the aqueous phase of the water-in-oil emulsion is adjusted from alkaline to slightly acidic. This pH adjustment will prevent hydrolysis of the resultant copolymers formed.

The subject materials have been tested and have been found to have utility as sludge dewatering agents and retention aids for use in the manufacture of paper. It is expected that materials of this type can be employed in applications for high molecular weight cationic polymers, are currently being used, such as in the area of dewatering of municipal and industrial waste materials, in the mining industry, in the paper industry, and the like.

Having thus described my invention I claim:

1. A water-in-oil emulsion of an acrylamide-dimethylaminopropylacrylamide copolymer having been prepared by the steps comprising:
   A. forming a water-in-oil emulsion of an acrylamide-acrylonitrile copolymer, said water-in-oil emulsion containing:
      a. 5–60% by weight acrylamide-acrylonitrile copolymer containing 1–50% by weight acrylonitrile;
      b. 20–90% water;
      c. 5–75% of an inert hydrophobic organic liquid; and
      d. 0.1–21% water-in-oil emulsifying agent;
   B. reacting said water-in-oil emulsion of the acrylamide-acrylonitrile copolymer with dimethylaminopropylamine in a molar ratio of dimethylaminopropylamine to acrylonitrile of from 1:1 to 0.1:1;
   C. recovering a readily invertible water-in-oil emulsion of an acrylamide-dimethylaminopropyl acrylamide copolymer.

2. The water-in-oil emulsion of an acrylamide:dimethylaminopropyl acrylamide copolymer of claim 1 wherein the dimethylaminopropylamine is reacted with the acrylamide:acrylonitrile copolymer at a temperature of from 20°–80° C.

3. The water-in-oil emulsion of an acrylamide-dimethylaminopropylacrylamide copolymer of claim 1 wherein the water-in-oil emulsion of the acrylamide:acrylonitrile copolymer contains, prior to reaction with dimethylaminopropylamine:
   A. 25–35% acrylamide-acrylonitrile copolymer, said copolymer containing 10–40% by weight acrylonitrile;
   B. 30–55% by weight water;
   C. 20–30% inert hydrophobic liquid;
   D. 1.2–10% water-in-oil emulsifying agent.

4. The water-in-oil emulsion of an acrylamide:dimethylaminopropylacrylamide copolymer of claim 1 wherein the acrylamide-acrylonitrile copolymer has a weight ratio of acrylamide to acrylonitrile of from 95:5 to 50:50.

5. The water-in-oil emulsion of acrylamide-dimethylaminopropyl acrylamide copolymer of claim 1, wherein said copolymer having a molecular weight of greater than 1,000,000.

6. A method for the preparation of a water-in-oil emulsion of an acrylamide-dimethyl amino propyl acrylamide polymer comprising the steps of:
   A. forming a water-in-oil emulsion of an acrylamide-acrylonitrile copolymer, said water-in-oil emulsion containing:
      a. 5–60% by weight acrylamide-acrylonitrile copolymer containing 1–50% by weight acrylonitrile;
      b. 20–90% water;
      c. 5–75% of an inert hydrophobic organic liquid; and
      d. 0.1–21% water-in-oil emulsifying agent;
   B. reacting said water-in-oil emulsion of the acrylamide-acrylonitrile copolymer with dimethylaminopropylamine in a molar ratio of dimethylaminopropylamine to acrylonitrile of from 1:1 to 0.1:1;

C. recovering a readily invertible water-in-oil emulsion of an acrylamide-dimethylaminopropyl acrylamide copolymer.

7. A method for the preparation of a water-in-oil emulsion of an acrylamide-dimethyl amino propyl acrylamide polymer comprising the steps of:

A. Forming a water-in-oil emulsion of an acrylamide-acrylonitrile copolymer, said water-in-oil emulsion containing:

a. 25-35% by weight acryamide-acrylonitrile copolymer containing 10-40% by weight acrylonitrile;
   b. 30-55% water;
   c. 20-30% of an inert hydrophobic organic liquid; and
   d. 1.2-10% water-in-oil emulsifying agent;

B. reacting said water-in-oil emulsion of the acrylamide-acrylonitrile copolymer with dimethylaminopropylamine in a molar ratio of dimethylaminopropylamine to acrylonitrile of from 1:1 to 0.1:1.

* * * * *